United States Patent Office 3,144,237
Patented Aug. 11, 1964

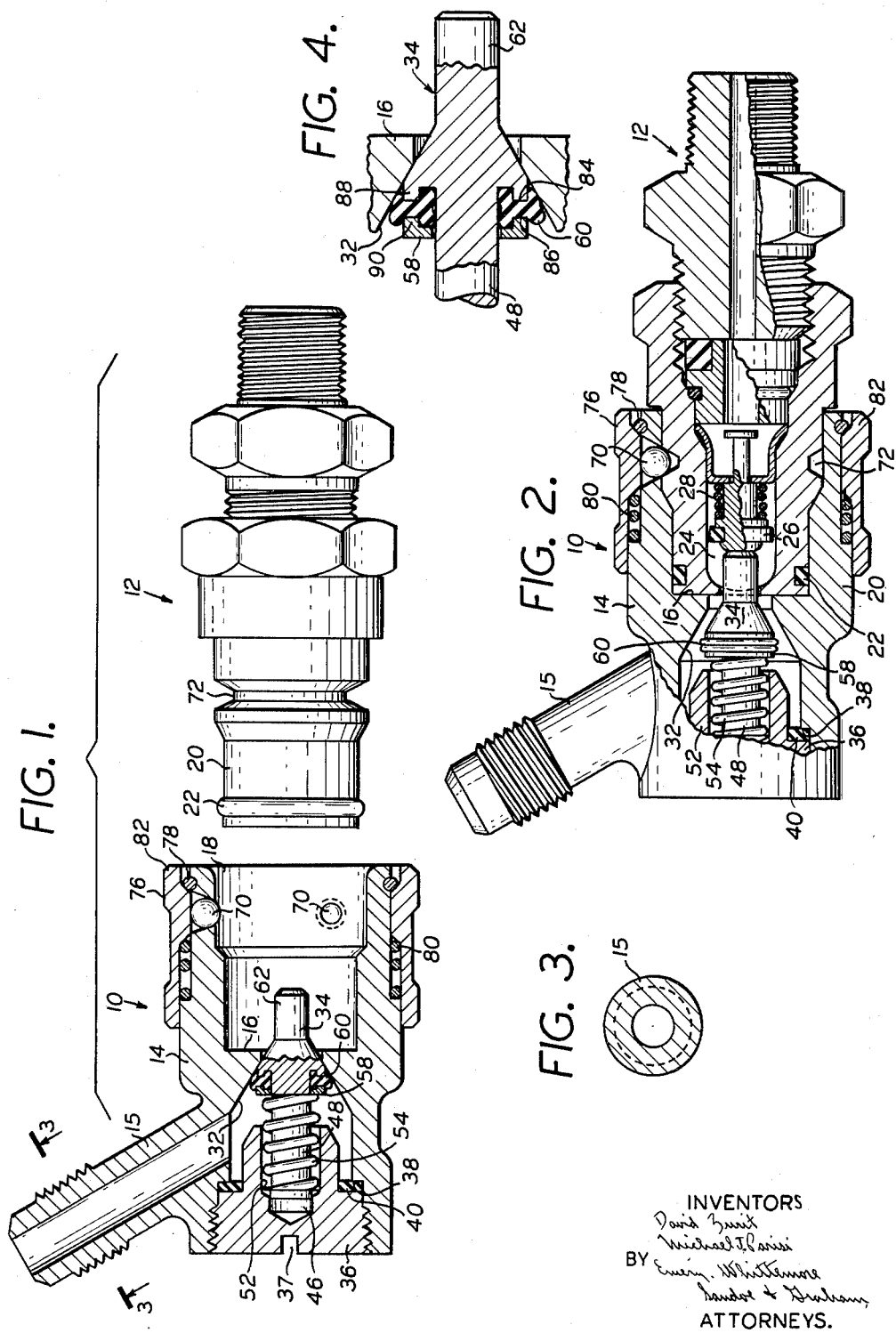

3,144,237
ANGULAR DISCONNECT COUPLING
David Zurit, Teaneck, and Michael J. Parisi, Paramus, N.J., assignors to Tap-Rite Products Corp., Hackensack, N.J., a corporation of New Jersey
Filed Feb. 7, 1962, Ser. No. 171,691
1 Claim. (Cl. 251—149.6)

This invention relates to improvements in angular connectors which are used in fluid lines and which can be disconnected under pressure.

Such connectors are made up of two different connector assemblies, one of which fits into the other. It is an object of this invention to provide an improved construction for one of the connector assemblies, and more particularly for the one having a socket into which the other connector assembly fits.

It is another object of the invention to provide an improved angular connector assembly having a small number of parts and having the parts so related that the connector assembly can be put together and taken apart quickly, and with provision for replacing sealing rings with a minimum of labor. Another object it to provide an improved connector assembly which is rugged in construction and reliable in use, and in which the fluid has a large cross section for flow when the valve element of the connector assembly is in open position.

Other objects, features and advantages of the invention will appear or be pointed out as the description proceeds.

In the drawing, forming a part hereof, in which like reference characters indicate corresponding parts in all the views:

FIGURE 1 is a view, mostly in section, showing the connector assembly of this invention and a complementary connector assembly to which it is intended to be joined;

FIGURE 2 is an enlarged view, similar to FIGURE 1, but showing the connector assemblies connected to one another, and the valve element of this invention in open position;

FIGURE 3 is a sectional view taken on the line 3—3 of FIGURE 1; and

FIGURE 4 is an enlarged, fragmentary, sectional view through the valve element and flange shown in FIGURES 1 and 2.

The connector assembly of this invention is indicated by the reference character 10 in FIGURE 1. The complementary connector assembly, with which the invention is intended to be used, is indicated by the reference character 12. The connector assembly 10 includes a sleeve 14 having a passage extending through it in the direction of its length and having a branch 15. A passage extending through the branch communicates with the passage through the sleeve, the passages meeting at an acute angle, as shown in the drawing.

A flange 16 is located intermediate the ends of the sleeve 14 and extends inwardly to reduce the cross section of the passage through the sleeve; the flange 16 being preferably of one-piece construction with the sleeve. The flange 16 forms one end of a socket 18 in the forward end of the sleeve 14, and this socket receives the complementary end of the other connector assembly 12.

The other connector assembly 12 has a cylindrical portion 20 which fits freely into the socket 18, but with an O-ring 22 for sealing the clearance between the cylindrical portion 20 and the sides of the socket 18. There is a passage 24 through the cylindrical portion 20 of the connector assembly 12; and this passage 24 is closed by a valve element 26 urged into closed position by a spring 28. When the valve element 26 is moved toward the right, in FIGURE 2, against the force of the spring 28, liquid is free to flow around the edges of the valve element 26 and through the passage 24.

The connector assembly of this invention has a tapered face 32 on the rearward side of the flange 16, and this tapered face provides a seat for a valve element 34. There is a fitting 36 at the rearward end of the sleeve 14, and this fitting 36 screws into a counterbore at the end of the sleeve and closes one end of the passage through the sleeve. There is preferably a slot 37 in the fitting 36 for receiving a screwdriver by which the fitting can be screwed into the sleeve or removed therefrom when necessary.

The fitting 36 is limited in its movement into the sleeve by a shoulder 38. A sealing ring 40, clamped between the fitting 36 and the shoulder 38, seals the closed end of the fitting against leakage of fluid from within the fitting. Other sealing means can be used, if desired.

There is a socket 46 in the fitting 36, and the valve element 34 has a rearwardly-extending stem 48 which slides in the socket 46 as the valve element moves toward and from the seat surface of the flange 16. Thus, the socket 46 provides a guide bearing for the valve stem 48; and the tapered face 32 of the flange 16 maintains the other end of the valve stem 48 and the valve element 34 in axial alignment with the passage in the sleeve 14.

There is a counterbore 52 in the forward end of the fitting 36 for receiving the rearward end of a spring 54. This spring 54 is compressed between the end face of the counterbore 52 and a washer 58 at the back of the valve element 34. The spring 54 is a helix around the valve stem 48, as clearly shown in the drawing.

The valve element 34 includes a packing ring 60 which will be described more fully in connection with FIGURE 4. For the present it is sufficient to understand that this packing ring 60 is the part of the valve element which actually contacts with the seat provided by the tapered face 32 of the flange 16.

The valve element 34 has a forwardly extending stem 62 which contacts with the valve element 26 of the complementary connector assembly 12 before the cylindrical portion 20 of the connector assembly 12 has been inserted fully into the socket 18. As the cylindrical portion 20 is advanced, toward the left in FIGURE 1, the valve stem 62 pushes the valve element 26 into open position and is itself displaced so as to push the valve element 34 into open position, as shown in FIGURE 2.

The forward end of the fitting 36 extends beyond the end of the passage through the branch 15. This is advantageous in that it makes the connector assembly shorter while still providing adequate guiding surfaces for the valve stem and the spring 54. In order to prevent the fitting 36 from obstructing free flow of fluid between the branch 15 and the passage through the sleeve 14, the forward portion of the fitting 36 is made with a diameter substantially less than the diameter of that portion of the valve chamber into which the forward portion of the fitting extends. This leaves a radial clearance between the fitting 36 and the wall of the sleeve through which the branch passage opens and thus provides an annular space around the forward portion of the fitting 36. In the preferred construction, this annular space has a cross section at least as great as the cross section of the passage through the branch 15.

The connector assemblies 10 and 12 are secured together by balls 70 located at angularly-spaced positions around the circumference of the sleeve 18 in position to engage a circumferential groove 72 in the cylindrical portion 20 of the connector assembly 12. These balls 70 are located in openings in the sleeve 14 and they are of a diameter somewhat greater than the depth of the openings in which they are located. They are held against outward displacement and forced to remain engaged in the groove 72 by a slide ring 76 which is movable longitudinally on the outside of the sleeve 14.

This slide ring 76 is held on the sleeve 14 by a snap ring 78 located in a groove in the outside surface of the sleeve 14. A shoulder of the slide ring 76 contacts with the snap ring 78 to prevent the slide ring from coming off the sleeve 14. The slide ring 76 can be moved toward the left, in FIGURES 1 and 2, against the pressure of a coil compression spring 80, to bring an end portion 82 of the slide ring 76 over the balls 70. This end portion 82 is of large enough diameter to permit the balls 70 to move outwardly far enough to let the cylindrical portion 20 of the connector assembly 12 pass freely into and out of the socket 18. This detachable connecting means for the connector assemblies 10 and 12 is conventional and is merely representative of detachable connecting means for securing the connector assembly 10 to a complementary connector assembly.

FIGURE 4 shows the valve element 34 on a greatly enlarged scale. The sealing ring 60 is of dumb-bell cross section and it has an annular groove 84 in its front face and a corresponding annular groove 86 in its rear face. A circumferential bead 88, around the peripheral portion of a face of the valve element 34, engages the groove 84; and a similar bead 90 on the front of the washer 58 engages the groove 86.

The spring 54 compresses the washer 58 against the sealing ring 60 and thus holds the sealing ring clamped between the washer 58 and the confronting face of the valve element 34. This construction holds the ring 60 securely in place and prevents radial displacement of the ring either inwardly or outwardly as a result of the various forces to which the ring is subjected, including the force of the fluid flowing through the clearance around the valve element when in open position, and including also the force to which the sealing ring is subjected in the case of any sticking of the ring to the face 32 of the flange.

The preferred embodiment of the invention has been illustrated and described, but changes and modifications can be made and some features can be used in different combinations without departing from the invention as defined in the claim.

What is claimed is:

In a connector assembly for one side of a connector that is adapted to be disconnected while under pressure, the assembly including a sleeve, a valve seat intermediate the ends of the sleeve and having a frusto-conical surface at an acute angle to the longitudinal axis of the sleeve, the portion of the sleeve in front of the seat forming a socket for receiving a complementary assembly of the connector, a valve chamber in the sleeve behind the seat, and a valve element in the chamber, the improvement which comprises a branch extending from the sleeve and having a passage therethrough extending in a direction at an acute angle to the longitudinal axis of the sleeve and sloping in a similar direction as the acute angle of the seat, the branch passage opening into the valve chamber at a location which is rearward of the valve element when the valve element is in open position, a valve stem extending from the valve element in a direction away from the valve seat, a guide in which the valve stem slides, the guide including a wall extending inwardly from one end of the valve chamber and the outside surface of the wall having at least its inner end portion converging as it extends toward the valve element, and characterized by the valve element including a packing ring extending beyond the other parts of the valve element and constituting a surface of the valve element that contacts with the seat, there being a washer surrounding a stem of the valve element in position to clamp the packing ring against a confronting surface of the valve element immediately ahead of the ring, the ring having a generally dumb-bell cross section in a radial plane when said ring is clamped between the washer and valve element, and the washer and confronting face of the valve element having grooves therein which confine one end of the dumb-bell cross section to hold the ring against radial displacement away from the axis of the stem.

References Cited in the file of this patent

UNITED STATES PATENTS

| | | |
|---|---|---|
| 754,021 | Staples | Mar. 8, 1904 |
| 1,370,128 | Kraft | Mar. 1, 1921 |
| 1,581,007 | McFarland | Apr. 13, 1926 |
| 1,651,778 | Rice | Dec. 6, 1927 |
| 2,103,503 | White | Dec. 28, 1937 |
| 2,124,937 | Whittle | July 26, 1938 |
| 2,199,143 | Stholberg | Apr. 30, 1940 |
| 2,770,474 | Krapp | Nov. 13, 1956 |
| 3,074,685 | Eckert | Jan. 22, 1963 |

FOREIGN PATENTS

| | | |
|---|---|---|
| 766,771 | France | Apr. 23, 1934 |